United States Patent
Shibahara

(10) Patent No.: US 9,866,722 B2
(45) Date of Patent: Jan. 9, 2018

(54) IMAGE FORMING DEVICE INCLUDING CORRECTION PROCESS

(71) Applicant: KYOCERA Document Solutions Inc., Osaka-shi, Osaka (JP)

(72) Inventor: Masami Shibahara, Osaka (JP)

(73) Assignee: KYOCERA DOCUMENT SOLUTIONS INC., Osaka-shi, Osaka (JP)

( * ) Notice: Subject to any disclaimer, the term of this patent is extended or adjusted under 35 U.S.C. 154(b) by 0 days.

(21) Appl. No.: 15/276,816

(22) Filed: Sep. 27, 2016

(65) Prior Publication Data
US 2017/0094099 A1 Mar. 30, 2017

(30) Foreign Application Priority Data
Sep. 30, 2015 (JP) ................................ 2015-193347

(51) Int. Cl.
*H04N 1/23* (2006.01)
*H04N 1/387* (2006.01)

(52) U.S. Cl.
CPC ......... *H04N 1/2369* (2013.01); *H04N 1/2338* (2013.01); *H04N 1/387* (2013.01); *H04N 2201/0094* (2013.01)

(58) Field of Classification Search
None
See application file for complete search history.

(56) References Cited

U.S. PATENT DOCUMENTS

2009/0037384 A1* 2/2009 Ono ................. G06F 17/30259

FOREIGN PATENT DOCUMENTS

JP 2014011612 A 1/2014
JP 2014064184 A * 4/2014

* cited by examiner

*Primary Examiner* — Andrew H Lam

(57) ABSTRACT

The image forming device includes an image formation request accepting section, an image data acquisition section, a readability improvement request accepting section, an area discriminating section, a line width measuring section, a correction object extracting section, a correction processing section, and an image forming section. The area discriminating section discriminates between a line drawing area and an area other than the line drawing area in the image data, and extracts a letter and a line. The line width measuring section measures the line width of the line or the letter. The correction object extracting section extracts an area where the line width measured by the line width measuring section is lower than the predetermined threshold as a correction object. The correction processing section broadens the width of the area determined as the correction object up to the predetermined value, to form corrected data for printing.

4 Claims, 10 Drawing Sheets

IMAGE FORMING DEVICE INCLUDING CORRECTION PROCESS

INCORPORATION BY REFERENCE

The disclosure of Japanese Patent Application No. 2015-193347 filed on Sep. 30, 2015 including the specification, drawings and abstract is incorporated herein by reference in its entirety.

BACKGROUND

The present disclosure relates to an image forming device.

An image forming device represented by a multifunction peripheral and the like forms an image by reading an image of the manuscript in an image reader, irradiating a photoreceptor, which is installed in a image forming section, with light to form an electrostatic latent image on the photoreceptor on the basis of the image read in the image forming section. Then, a charged developer such as a toner is supplied on the formed electrostatic latent image to form a visible image, then the electrostatic latent image is transferred to and fixed on a sheet of paper, and the sheet is discharged out of the device.

The users of such an image forming device include a weak-sighted person such as an elderly person. In some known techniques, readability of a printed matter is improved by correction of image data so that a weak-sighted person can easily read the printed matter. For example, a technique relating an image forming device that determines the eyesight of a user and magnifies letters depending on the result of the determination is disclosed. As another example, a technique relating an image forming device that has an interchangeable two modes, including a normal mode and a correction mode and that makes correction of an image to be more readable in the correction mode is disclosed.

SUMMARY

In one aspect of the present disclosure, the image forming device includes an image formation request accepting section, an image data acquisition section, a readability improvement request accepting section, an area discriminating section, a line width measuring section, a correction object extracting section, a correction processing section, and an image forming section. The image formation request accepting section accepts a request for image formation from a user. The image data acquisition section acquires image data together with the request for image formation. The readability improvement request accepting section accepts a request for improving readability from the user. When the readability improvement request accepting section accepts a request for improving readability, the area discriminating section discriminates between a line drawing area and an area other than the line drawing area in the image data, and extracts a letter and a line in an area that is discriminated as a line drawing area. The line width measuring section measures the line width of the line or the letter. The correction object extracting section extracts an area where the line width measured by the line width measuring section is lower than the predetermined threshold as a correction object. The correction processing section broadens the width of the area extracted as the correction object by the correction object extracting section up to a predetermined value, and corrects the image data to form corrected data for printing. The image forming section forms an image on a recording medium on the basis of the corrected data for printing formed by the correction processing section.

DETAILED DESCRIPTION

Figure 1:
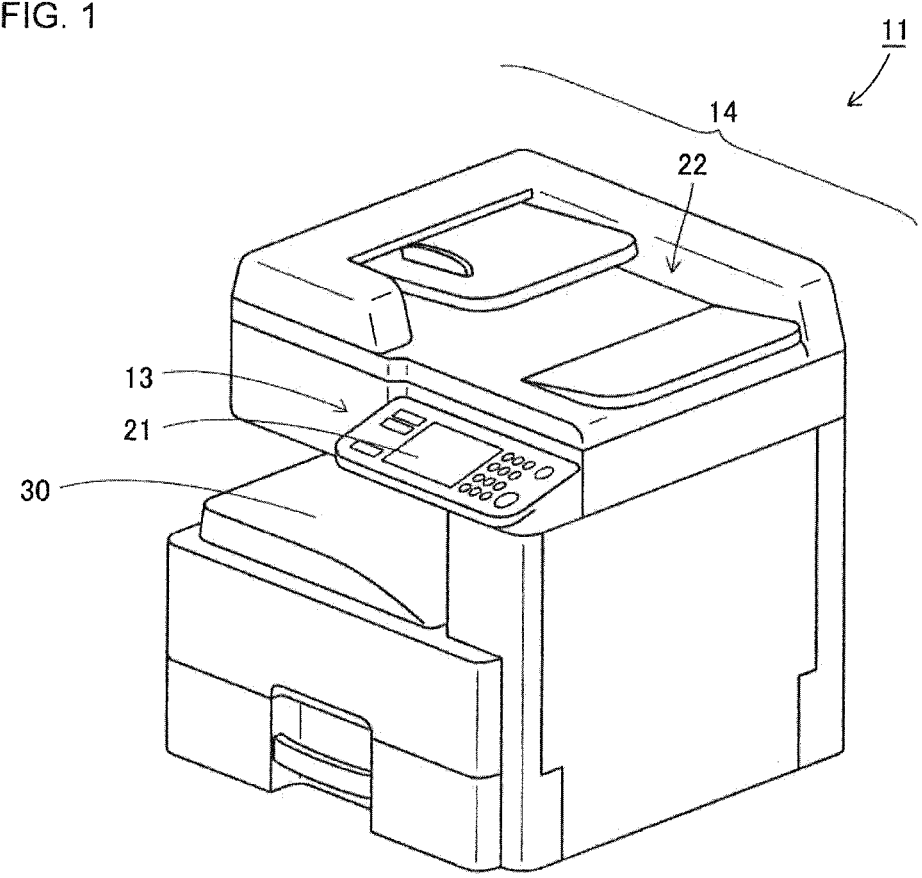
FIG. 1 is a schematic perspective diagram illustrating the appearance of a multifunction peripheral when an image forming device according to one embodiment of the present disclosure is applied to the multifunction peripheral.
Figure 2:
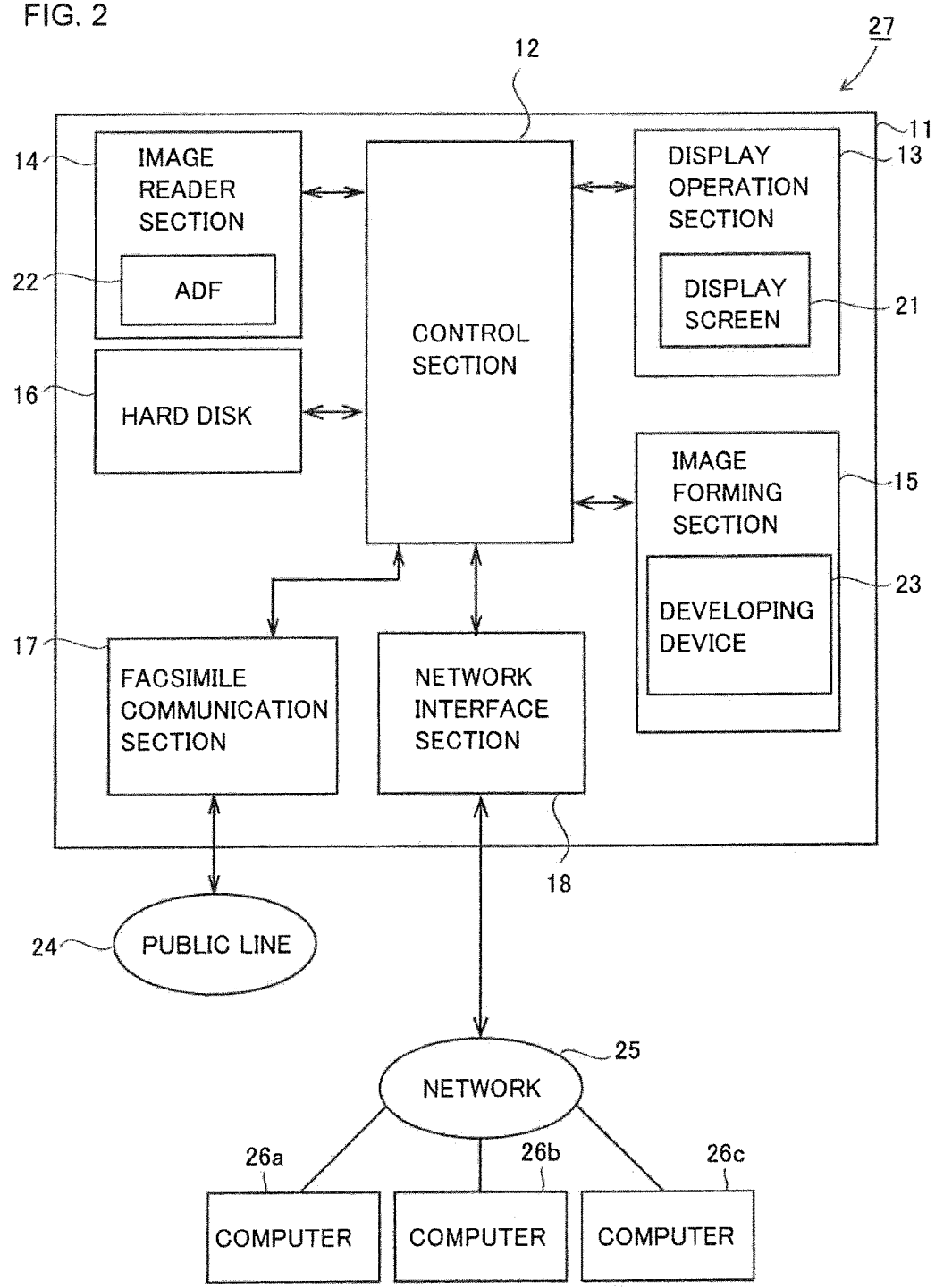
FIG. 2 is a block diagram illustrating the constitution of the multifunction peripheral when an image forming device according to one embodiment of the present disclosure is applied to the multifunction peripheral.

Hereinafter, the embodiments of the present disclosure are described. FIG. 1 is a schematic perspective diagram illustrating the appearance of a multifunction peripheral when an image forming device according to one embodiment of the present disclosure is applied to the multifunction peripheral. FIG. 2 is a block diagram illustrating the constitution of the multifunction peripheral when an image forming device according to one embodiment of the present disclosure is applied to the multifunction peripheral.

Referring to FIGS. 1 and 2, the multifunction peripheral 11 as the image forming device according to one embodiment of the present disclosure includes a control section 12, a display operation section 13, an image reader section 14, an image forming section 15, a discharge tray 30, a hard disk 16, a facsimile communication section 17, and a network interface section 18 that establishes a connection with a network 25.

The control section 12 controls the entire multifunction peripheral 11. The display operation section 13 includes a display screen 21 displaying information transmitted from the multifunction peripheral 11 side or the content input by a user. The display operation section 13 accepts an input of a condition for image forming, such as the required number of copies or gradation of image, or a request for switching on/off of the power. The image reader section 14 includes an automatic document feeder (ADF) 22 automatically conveying a manuscript from the set position to the reading position. The image reader section 14 reads an image of a manuscript conveyed to the reading position by the ADF 22 or an image of a manuscript mounted on a mounting table. The image forming section 15 includes a developing device 23 to form a visible image using a toner. The image forming section 15 forms an image on the basis of the read image data or image data transmitted via the network 25. That is, the image forming section 15 forms an image on a recording medium such as a sheet of paper on the basis of the image data in response to the accepted request for image formation. The recording medium on which the image is formed by the image forming section 15 is discharged on the discharge tray 30 as a printed matter. The hard disk 16 stores transmitted image data, input image forming conditions, and the like. The facsimile communication section 17 is connected to a public line 24, and performs facsimile transmission and facsimile reception.

Although the multifunction peripheral 11 includes a DRAM (Dynamic Random Access Memory), which writes and reads image data, and a paper conveying section that conveys a sheet of paper on which a visible image is formed using a developer, an illustration and a description thereof are omitted. The arrows in FIG. 2 indicate the flow of control signals and data relating to the control and the images.

The multifunction peripheral 11 operates as a copying machine by forming an image on the basis of the image data acquired by the image reader section 14 and printing the image on a sheet of paper. Also, the multifunctional peripheral 11 operates as a printer by forming an image in the image forming section 15 on the basis of image data transmitted from a computer 26a, 26b, or 26c, which is connected to the network 25, through the network interface section 18, and then printing an image on a sheet of paper. The multifunctional peripheral 11 also operates as a facsimile device by forming an image in the image forming section 15 through the DRAM on the basis of image data transmitted from the public line 24 through the facsimile communication section 17, or by transmitting image data acquired by the image reader section 14 to the public line 24 through the facsimile communication section 17. That is, the multifunctional peripheral 11 has a plurality of functions relating to image processing, such as a copying function, a printer function, and a facsimile function. Furthermore, the multifunctional peripheral 11 allows detailed settings of each function.

Image forming system 27 includes the multifunction peripheral 11 and a plurality of computers 26a, 26b and 26c. Specifically, the Image forming system 27 includes the multifunction peripheral 11 having the constitution as described above and a plurality of computers 26a, 26b and 26c that are to be connected to the multifunction peripheral 11 through the network 25. In this embodiment, three computes are shown as the plurality of computers 26a-26c. Each of the computers 26a-26c can require an image formation to the multifunction peripheral 11 through the network 25. The multifunction peripheral 11 and computers 26a-26c may be connected to each other by wired connections through LAN (Local Area Network) cables, or may be connected by wireless connections. The network 25 may be constituted to include other devices which are connected to the above apparatuses, for example, other multifunction peripherals or servers such as a mail server.

Figure 3:
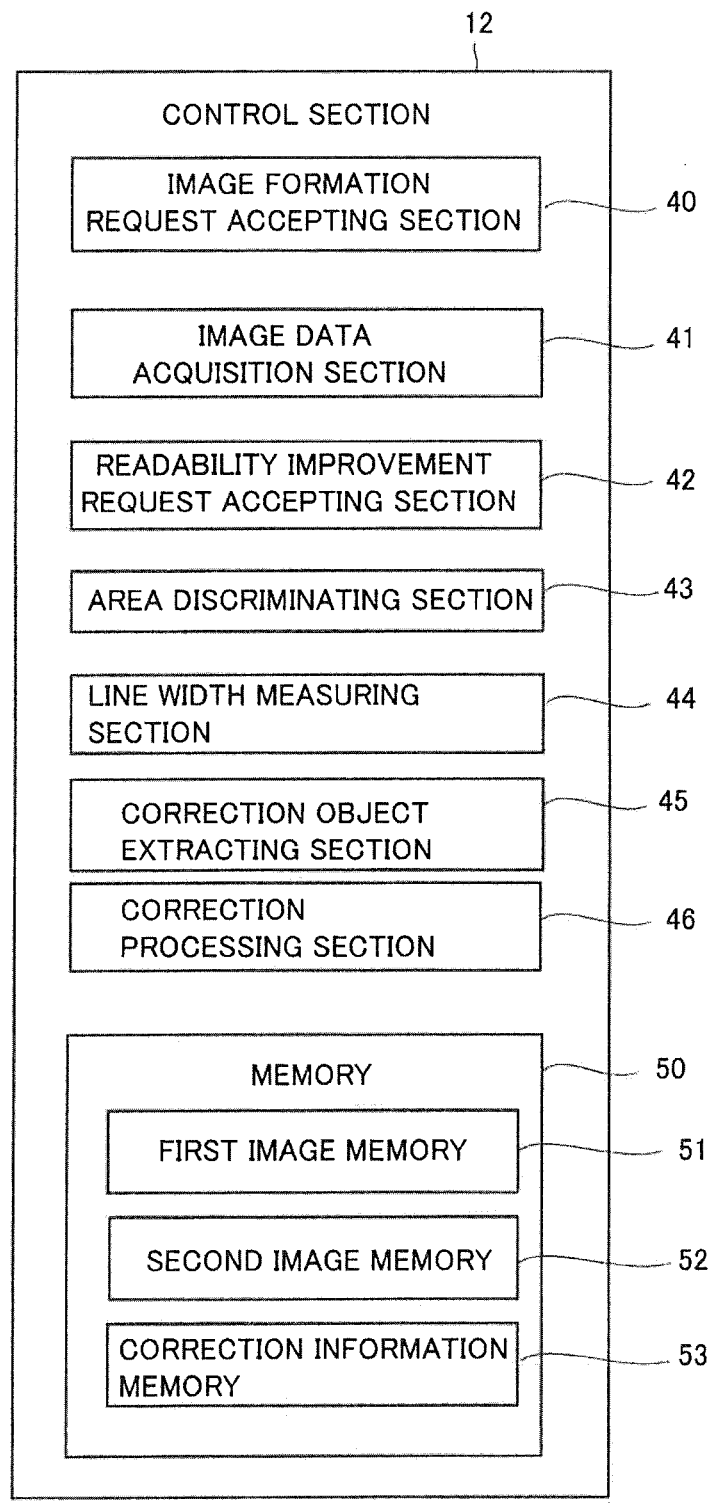
FIG. 3 is a block diagram illustrating an example of the constitution of a control section.

Next, the constitution of the control section 12 is described. FIG. 3 is a block diagram illustrating an example of the constitution of the control section 12. Referring to FIG. 3, the control section 12 includes an image formation request accepting section 40, an image data acquisition section 41, a readability improvement request accepting section 42, an area discriminating section 43, a line width measuring section 44, a correction object extracting section 45, a correction processing section 46 and a memory 50.

The image formation request accepting section 40 accepts a request for image formation from a user. The image data acquisition section 41 acquires image data by reading a manuscript in the image reading section 14, or by receiving image data transmitted from the computer 26a, 26b, or 26c which is connected to the network 25. The acquired image data is stored in a first image memory 51 in the memory 50.

The readability improvement request accepting section 42 accepts a request (readability improvement request) for improving readability of the printed matter. The control section 12 controls processing to improve readability of the printed matter in response to the request.

Specifically, when the readability improvement request accepting section 42 accepts the readability improvement request, the area discriminating section 43 in the control section 12 accesses image data stored in the first image memory 51 and discriminates between a line drawing area and an area other than the line drawing area in the image data. Then, the area discriminating section 43 extracts letters or lines in the area that is discriminated as a line drawing area. The line width measuring section 44 measures the line width of the letters or the lines which are extracted by the area discriminating section 43. The correction object extracting section 45 compares the line width measured by the line width measuring section 44 and the predetermined threshold. As a result of the comparison, an area having a line width of less than the threshold is extracted as a correction object. The width of the correction object extracted by the correction object extracting section 45 is broadened to a predetermined value by the correction processing section 46. After the broadening processing, the correction processing section 46 corrects image data to form corrected data for printing. The formed corrected data for printing are stored in a second image memory 52 in the memory 50. The image forming section 15 forms an image on a recording medium on the basis of the corrected data for printing.

Such a series of image formation modes, which are performed after the readability improvement request accepting section 42 accepts a readability improvement request, are referred to as a "readability improvement mode" or a "senior mode" in the description of the present application. Note that, when no readability improvement is requested, the image forming section 15 forms an image on a recording medium on the basis of original (uncorrected) image data acquired by the image data acquisition section 41. This image forming mode is referred to as a normal printing mode. The readability improving mode and the normal printing mode is interchangeable through an operation by a user.

The memory 50 includes a first image memory 51, a second image memory 52, and a correction information memory 53. As described above, the first image memory 51 stores data acquired by the image data acquisition section 41, and the second image memory 52 stores a corrected data for printing. The correction information memory 53 stores the threshold, which is a standard for determination by the correction object extracting section 45, and conditions for broadening the width of lines or letters.

Then, a case where a user forms an image using a multifunction peripheral 11 according to one embodiment of this disclosure is described. Here, a case where a user copies an image of a manuscript is assumed.

Figure 4:
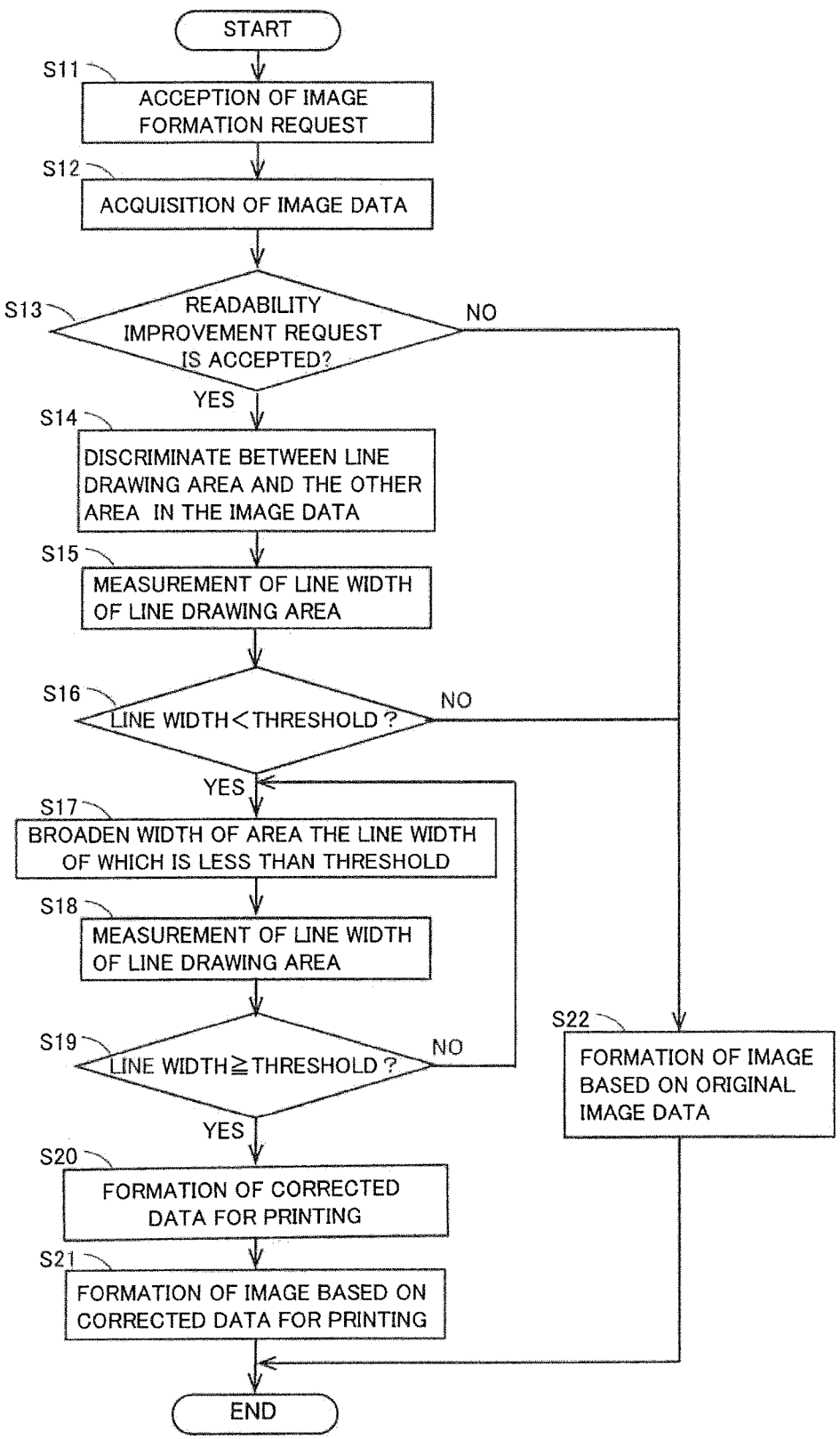
FIG. 4 is a flow chart illustrating a flow of processing when an image is formed using the multifunction peripheral according to one embodiment of the present disclosure.
Figure 5:
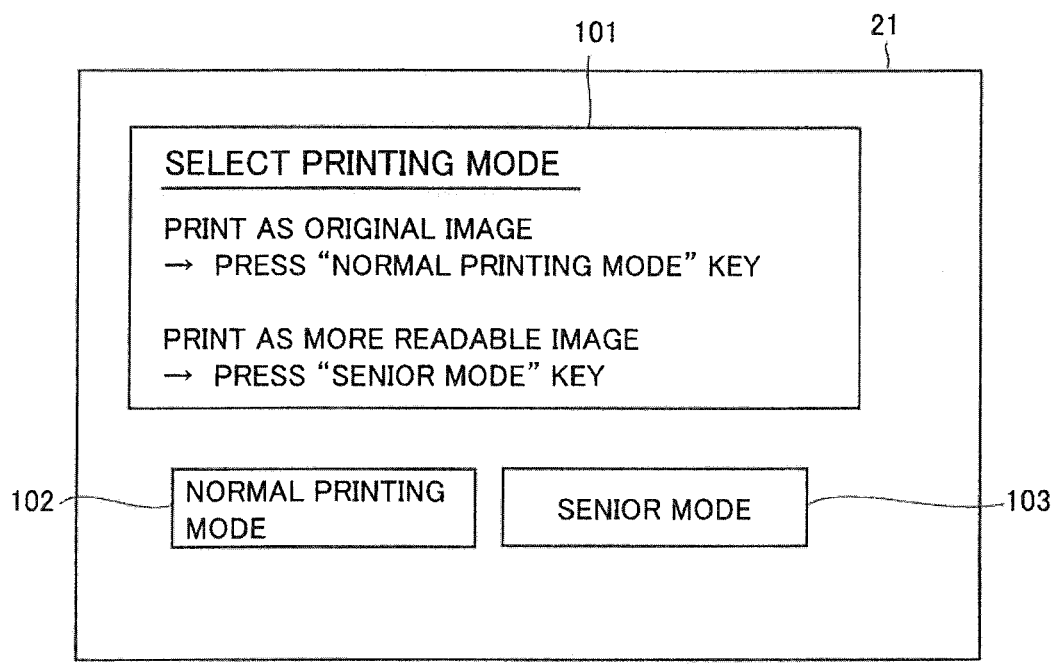
FIG. 5 is a view illustrating an example of the display on the display screen.

FIG. 4 is a flow chart illustrating a flow of processing when a printed matter is output using the multifunction peripheral 11 according to one embodiment of the present disclosure. FIG. 5 is a view illustrating an example of the display on the display screen 21.

Referring to FIG. 4, a user goes in front of the multifunction peripheral 11 and sets a manuscript on the ADF 22. The control section 12 detects the manuscript set on the ADF 22. The user requires an image formation through operation of the display screen 21 of the display operation section 13 and the like. Then, the image formation request accepting section 40 accepts the request for image formation (step S11. Hereinafter, the "step" is omitted). When the request for image formation is accepted, the image reading section 14 reads the image of the manuscript with the aid of the ADF 22. The image data acquisition section 41 acquires the image data (S12). The acquired image data is stored in the first image memory 51.

Then, the readability improvement request accepting section 42 accepts a request for improving readability (readability improvement request) of the printed matter from a user (S13). FIG. 5 is a view illustrating an example of the display on the display screen 21 in the display operation section 13. Referring to FIG. 5, a message 101 to prompt the selection of a printing mode is displayed in the upper area of the display screen 21. In the lower area of the display screen 21, a key 102 to select a normal printing mode and a key 103 to select a senior mode (readability improving mode) are displayed. When a user intends to acquire a more readable printed matter, the user depresses the key 103 to select a senior mode. The readability improvement request accepting section accepts a request for improving readability when the depression of the key 103 is detected.

When the request for improving readability is accepted, the area discriminating section 43 discriminates between a line drawing area such as an area including lines or letters and an area other than the line drawing area, such as figures. In addition, the area discriminating section 43 also identifies letters and lines in the line drawing area (S14). For the discrimination or the identification, an image analysis technique such as an edge (border) detection technique may be used. The density suddenly changes around the border of lines or letters, whereas as the density mildly changes around the border of patterns or photographs. On the basis of this feature, for example, the area discriminating section 43 discriminates between the line drawing area including a letter or a line and the other area such as figures. Here, the area discriminating section 43 discriminates the line drawing area, and further, identifies lines and letters in the line drawing area.

Figure 6:
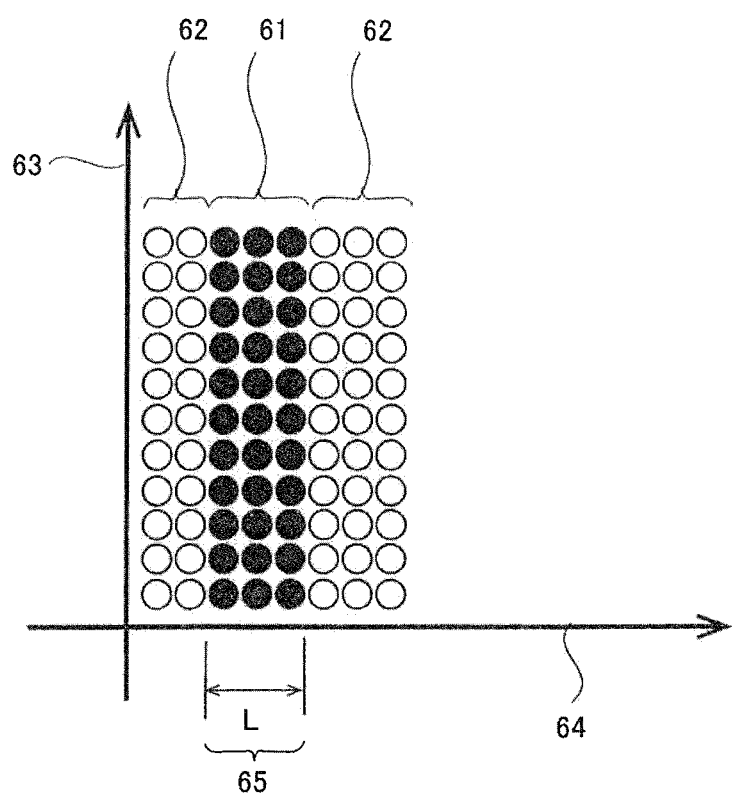
FIG. 6 is an enlarged view illustrating a part of a line drawing area expressed in dot units, and the line width thereof.

FIG. 6 is a view illustrating a state where a black line 61 is drawn on a white background 62. Referring to FIG. 6, the area discriminating section 43 first discriminates a line drawing area in image data and further identifies a line 61 in the line drawing area. For identification of the line 61, image data is scanned in the main scanning direction (the direction along the vertical axis) 63 and in the sub scanning direction (the direction along the horizontal axis) 64. This scanning provides color information relating to black and white in the line drawing area. Here, the black portion extending continuously in one direction is identified as a line (or a letter) when the portion has a width L in the direction perpendicular to the axis extending in the longitudinal extending direction of a predetermined value or less, for example, 10 dots or less. Further, the line width measuring section 44 acquires the value of the width L as the line width 65 of the line (or the letter) (S15).

Figure 7:
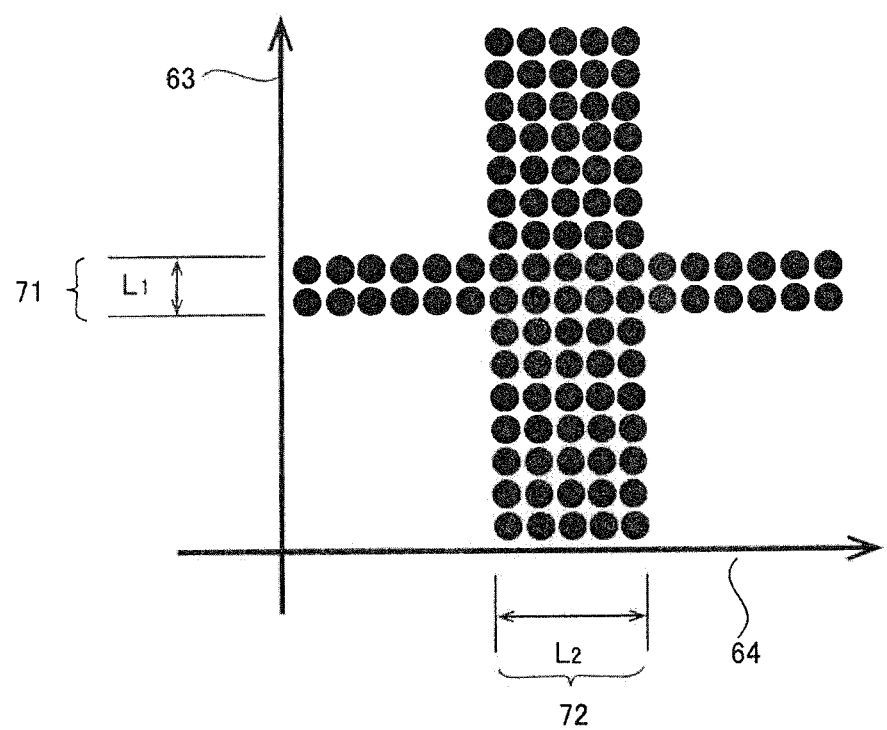
FIG. 7 is an enlarged view of a correction object.

Then, the correction object extracting section 45 compares the threshold stored in the correction information memory 53 with the value of the line width L (S16). At this time, the correction object extracting section 45 determines an area where either of the line width in the main scanning direction or the line width in the sub scanning direction is lower than the threshold as a correction object. The information of the threshold is stored by the correction information memory 53. FIG. 7 is an enlarged view of the intersection of a straight line (vertical line) 72 extending in the main scanning direction (the direction along the vertical axis) 63 and another straight line (horizontal line) 71 extending sub scanning direction (the direction along the horizontal axis) 64 in a line drawing area. The line width $L_1$ of the horizontal line 71 is 2 dots, and the line width $L_2$ of the vertical line 72 is 5 dots. For example, it is assumed that the threshold is predetermined as 3 dots. In this case, since the line width $L_2$ is larger than the threshold, the correction object extracting section 45 determines the vertical line 72 as an object to which correction is unnecessary. On the contrary, since the line width $L_1$ is smaller than the threshold, the correction object extracting section 45 determines the horizontal line 71 as an object to be corrected (a correction object).

The threshold may be predetermined as a default value of the image forming device, or may be variable so that a user can optionally change the threshold by inputting a number.

Alternatively, a condition of the threshold that a user set in the past may be recorded in the correction information memory 53, and, when the user logs in again, the condition of the threshold may be applied.

Figure 8:
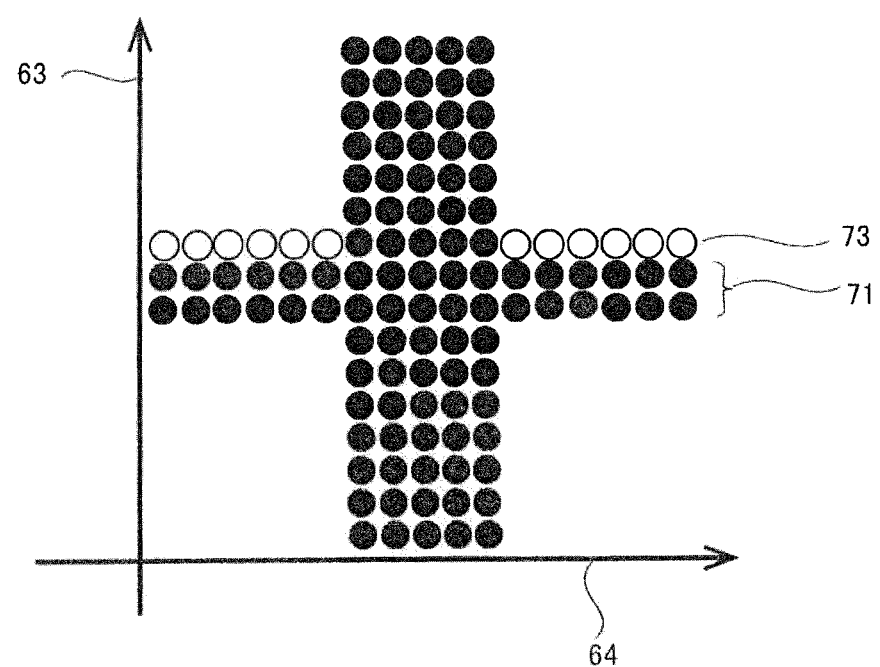
FIG. 8 is a view to explain the correction width of the horizontal line in the correction object.

The horizontal line 71, which is determined as a correction object by the correction object extracting section 45, is then broadened to a predetermined value by the correction processing section 46 (S17). FIG. 8 illustrates a portion 73 to which dots are added by broadening the width of the line. The dots to be added is calculated as a difference obtained by subtracting the line width $L_1$ of the horizontal line 71 (2 dots in FIGS. 7 and 8) from the predetermined value. For example, when the predetermined value is 3 dots, the horizontal line 71 is broadened by 1 dot (1=3−2). When the correction processing section 46 broadens the width of the horizontal line 71 by 1 dot, the horizontal line 71 is broadened and the horizontal line 71 becomes more readable (S17). The threshold and the predetermined value may be the same value, or different values. In FIG. 8, the upper part of the horizontal line 71 in the main scan direction (the direction along the vertical axis) is broadened by 1 dot. When a line is broadened by 2 or more dots, it is preferable to evenly broaden the both sides of the line in the direction perpendicular to the axis of symmetry of the horizontal line 71. For example, when the line illustrated in FIG. 8 is broadened by 2 dots, it is preferable that the upper side and the lower side of the horizontal line 71 along the main scan direction (the direction along the vertical axis) may be each broadened by 1 dot.

After broadening processing, the correction processing section 46 forms a corrected data for printing which reflects the content of the processing. The corrected data for printing are stored in the second image memory 52. Then, the line width measuring section 44 measures the line width of the line drawing area in the corrected data for printing, repeatedly (S18). The correction object extracting section 45 compares the line width L calculated by the line width measuring section 44 with the threshold, and determines an area having a line width of less than the threshold as a correction object. The width of the correction object is broadened by the correction processing section 46. The corrected data for printing already stored in the second image memory 52 is updated to reflect the content of the correction after broadening processing. These cycles are repeated, and the correction object extracting section 45 confirms whether all the line widths of lines or letters in all the line drawing areas are equal to or over the threshold (S19).

Figure 9:
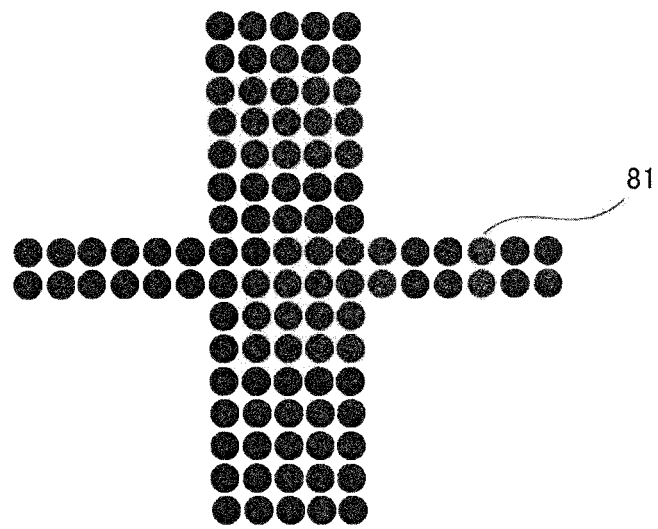
FIG. 9 is a view illustrating a correction object before or after the correction.
Figure 9:
Figure 9:
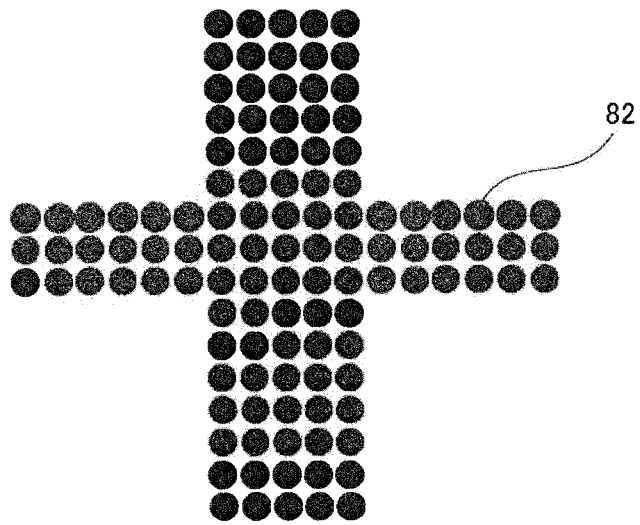

When it is confirmed that all the line widths of lines or letters in all the line drawing areas are equal to or over the threshold, the image forming section 15 forms an image on a recording medium such as a sheet of paper on the basis of the corrected data for printing, which is stored in the second image memory 52. The recording medium on which an image is formed is discharged on the discharge tray 30. The broadened image 82 on the recording medium becomes more readable since the horizontal line is wider in comparison with a standard line drawing 81 as illustrated in FIG. 9.

The multifunction peripheral 11 may form an image without broadening processing. When a user expects formation of an image based on the original image data, the user depresses the key 102, in which the indication "NORMAL PRINTING MODE" is displayed, in the display screen 21 illustrated in FIG. 5. When key 102 is depressed, the image forming section 15 forms an image on a recording medium on the basis of the image data stored in the first image memory 51 (S22). The recording medium on which an image is formed is discharged on the discharge tray 30. In this case, the image formed on the recording medium is a line drawing such as the line drawing 81 illustrated in the upper area of FIG. 9. The normal printing mode and the readability improvement mode are interchangeable. When a user intends an image formation in the normal printing mode, the user depresses the key 102. Meanwhile, the user intends an image formation in the readability improving mode (senior mode), the user depresses the key 103. The user can check which part is broadened by outputting a printed matter printed in the normal printing mode and a printed matter printed in the readability improving mode.

In the conventional art to improve the readability of difficult-to-read letters, some problems such as complication of the operation, breakage of the layout balance by broadened letters, and useless consumption of toners may be caused. According to the above image forming device, since the processing to broaden only the line drawing of the correction object having a line width of less than the predetermined threshold is performed, the width of the line drawing having the line width of equal to or over the threshold is not broadened. Also, since the entire letter is not broadened, the layout balance is maintained. Thus, the above image forming device enables to output a more readable printed matter with maintaining the layout balance as much as possible under reduced toner consumption.

In the embodiment, a case where a user uses the multifunction peripheral 11 as the image forming device as a copier is assumed. However, the multifunction peripheral 11 may be used for a purpose other than copying. For example, a user can use the multifunction peripheral 11 as a printer. In that case, the user first operates one of the computers 26a-26c, and requires an image formation to the image formation request accepting section 40 through the network 25 (S11). After the image formation request accepting section 40 accepted the request for an image formation, the image data acquisition section 41 receives the image data transmitted from the one of the computers 26a-26c (S12). The received image data is stored in the first image memory 51. Then, each of the steps S13-S22 is performed in a similar manner to the case where the multifunction peripheral 11 is used as a copier.

Figure 10:
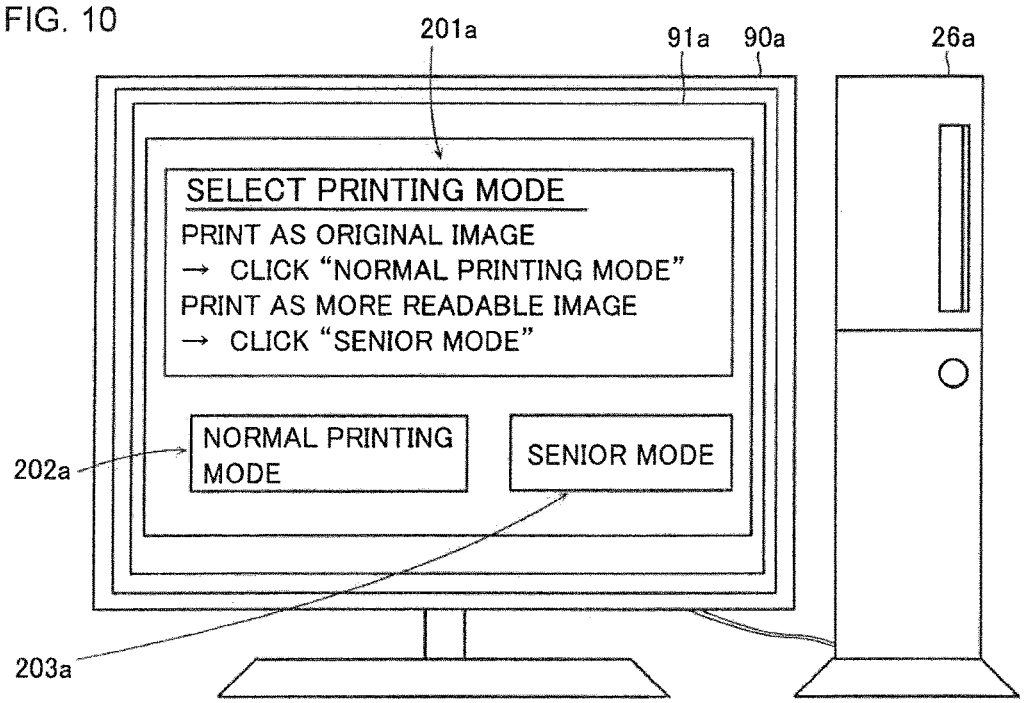
FIG. 10 is a view illustrating an example of the display on the display screen of the display device which is attached to a computer.

When the multifunction peripheral 11 is used as a printer, the content to select a printing mode is displayed on a display screen 91a of a display device 90a that is attached to the computer 26a in place of the display screen 21 illustrated in FIG. 5. FIG. 10 illustrates an example of the display on the display screen 91a. On the display device 90a, a message 201a to prompt the selection of printing modes, a key 202a to select the normal printing mode, and a key 203a to select a senior mode are displayed. A user can select an image formation mode by clicking a mouse button on the key 202a when the user intends to select the normal printing mode, or on the key 203a when the user intends to select the senior mode.

In the detailed description of the preferred embodiment, the recording medium of the printed matter is preferably a sheet of paper. However, the recording medium is not limited to a sheet of paper, and may use an OHP (Overhead Projector) sheet, and the like.

In the above embodiment, the multifunction peripheral 11 may have a constitution including a notification section to notify the part the width of which is broadened by the correction processing section 46. The notification section helps easy recognition of a broadened part. Specifically, notification is displayed in the display screen 21 of the display operation section 13.

The embodiments described above are to be considered in all aspects as illustrative only and not restrictive in any manner. The scope of this disclosure is defined not by the explanation described above, but by claims. All changes which come within the meaning and range of equivalency of the claims are to be embraced within the scope of the present disclosure.

The image forming device according to the present disclosure can be particularly effectively used when a weak-sighted person, for example, a person whose eyesight is deteriorated, for example, by presbyopia, intends to obtain a more readable printed matter.

What is claimed is:

1. An image forming device, comprising:
an image forming section and
a control unit controlling the entire image forming device, wherein
the control unit executes:
an image formation request accepting section that accepts a request for image formation from a user,
an image data acquisition section that acquires image data together with the request for image formation,
a readability improvement request accepting section that accepts a request for improving readability from the user,
an area discriminating section that discriminates between a line drawing area and an area other than the line drawing area in the image data, and extracts a letter and a line in an area that is discriminated as a line drawing area,
a line width measuring section that measures the line width of the line or the letter,
a correction object extracting section that extracts an area where the line width measured by the line width measuring section is lower than the predetermined threshold as a correction object,
a correction processing section that broadens the width of the area extracted as the correction object by the correction object extracting section up to a predetermined value, and corrects the image data to form corrected data for printing, and wherein the image forming section forms an image on a recording medium on the basis of the corrected data for printing formed by the correction processing section, and the correction object extracting section determines an area where either of the line width in the main scanning direction or the line width in the sub scanning direction is lower than the threshold as a correction object.

2. The image forming device according to claim 1, wherein the image forming device has a plurality of interchangeable image formation modes including a readability improvement mode that forms an image on a recording medium on the basis of the corrected data for printing and a normal printing mode that forms an image on the recording medium on the basis of an original image data acquired by the image data acquisition section, and, when the readability improvement request accepting section accepts a request for improvement of readability, the readability improvement mode is performed, and when improvement of readability is not requested, the normal printing mode is performed.

3. The image forming device according to claim 1, wherein the correction processing section evenly broadens the line or the letter extracted by the area discriminating section in the direction perpendicular to the axis of symmetry of the line or the letter.

4. The image forming device according to claim 1, further comprising a notification section to notify the part the width of which is broadened.

\* \* \* \* \*